United States Patent [19]

Neto

[11] Patent Number: 5,634,497

[45] Date of Patent: Jun. 3, 1997

[54] HOSE FOR SUCTION AND DISCHARGE OF ORE SLURRY OR ANY OTHER ABRASIVE MATERIAL

[75] Inventor: Emilio P. Neto, Sao Paulo, Brazil

[73] Assignee: The Goodyear Tire & Rubber Company, Akron, Ohio

[21] Appl. No.: 532,289

[22] Filed: Sep. 22, 1995

[51] Int. Cl.⁶ .............................. G01M 3/18; F16L 11/12
[52] U.S. Cl. ..................... 138/127; 138/104; 138/123
[58] Field of Search ........................... 138/104, 103, 138/123-127, 177, 178; 116/DIG. 7, 227, 204; 73/40.5 R, 49.1, 49.5

[56] References Cited

U.S. PATENT DOCUMENTS

| | | | |
|---|---|---|---|
| 2,759,175 | 8/1956 | Spalding | 138/104 |
| 4,446,892 | 5/1984 | Maxwell | 138/104 |
| 4,554,650 | 11/1985 | Brown et al. | 138/104 X |
| 5,267,670 | 12/1993 | Foster | 138/104 X |
| 5,305,798 | 4/1994 | Driver | 138/104 X |

FOREIGN PATENT DOCUMENTS 4-04004386A  1/1992  Japan ........................... 138/104

*Primary Examiner*—David Scherbel
*Assistant Examiner*—Patrick F. Brinson
*Attorney, Agent, or Firm*—Marc R. Dion, Sr.

[57] ABSTRACT

It is presented a hose (1) for suction and discharge of ore slurry or any other abrasive material, manufactured in accordance with the techniques already known for the manufacture of hoses for transport of abrasive material, which presents a sensor (11) fixed to the referred hose (1) which indicates the total or partial wear of the internal layer (3) of the hose (1), by means of the connection with the first and second layers of braided copper wires (4, 6) so that same may be replaced, thus avoiding its rupture or blow up when transporting abrasive material.

4 Claims, 2 Drawing Sheets

HOSE FOR SUCTION AND DISCHARGE OF ORE SLURRY OR ANY OTHER ABRASIVE MATERIAL

FIELD OF THE INVENTION

The present invention refers to a hose for suction and discharge of ore slurry or any other abrasive material, and, more particularly, to a hose for suction and discharge of ore slurry or any other abrasive material which presents a sensor which indicates complete wear of the inner lining of the hose in order to permit said hose to be replaced, thus avoiding its rupture or blow up when in use.

STATE OF THE ART DESCRIPTION

The hoses utilized for suction and discharge of ore slurry or any other abrasive material of the prior art are usually rubber hoses, consisting of a rubber tube internally lined with an abrasion resistant material, a carcass or reinforcing cover comprised of layers of rubber covered fabric, having embedded between them a reinforcing steel wire helix, wear resistant rubber cover and built in flanges at both ends. Said hoses for suction and discharge of abrasive material usually have an inner diameter in the range of from 2 to 40 cm (1 to 16 inches) and up to 20 meters length.

The hoses for suction and discharge of ore slurry or any other abrasive material are mainly used for pumping the ore slurry from one processing station to the next.

Since the hoses for suction and discharge are used for transporting abrasive material the inner layers of same are worn until leakage, rupture or even blow up of the hose occurs.

Since this is an internal wear, it is not possible to visually inspect the damage, therefore it is necessary to introduce a means or device which will indicate the total wear-out of the inner layer of the hose so that it may be replaced prior to the occurrence of unforeseeable and disagreeable problems during the pumping operation, due to blow up or rupture of the hoses.

A process for checking the wear of the structure and of the inner layers by means of ultra-sonography is known from the prior art. However, said process is inconvenient in that it may only be used on smooth surfaces or structures, thus being inefficient for hoses utilized for abrasive material suction and discharge since said hoses are not smooth.

Thus, it is desirable to develop a sensor device to indicate, by visual or auditive means, the total wear out of a hose with a rough inner structure, without interrupting the work in order to carry out checks on the condition of the hose.

SUMMARY OF THE INVENTION

The present invention refers to a hose for suction and discharge of ore slurry or any other abrasive material manufactured in accordance with the techniques already known for manufacturing hoses for abrasive material transportation, which, however, presents a sensor device fixed on said hoses, with the purpose of indicating the total wear of the hose so that it may be replaced.

Said sensor has the advantage of permitting checking the wear of the abrasive material transport hoses without interrupting the transport of the material, thus avoiding operating accidents with the transport hoses such as leakages, blow ups and others.

The sensor is comprised of a bi-polar socket fixed to one of the external layers of the hose for transport of abrasive material of the present invention, and connected, preferably to the terminal ends of braided strands of copper wires which extend spirally along the entire length of the hose.

In order to determine the wear of the hose it is necessary to verify, by means of the bi-polar socket, the continuity of the circuit. In case the electrical circuit is interrupted, this means that the hose shows signs of wear and should be replaced as soon as possible.

BRIEF DESCRIPTION OF THE DRAWINGS

The following detailed description of the embodiment of the present invention may be better understood and other embodiments will become clearer when viewed together with the attached drawings, wherein.

DETAILED DESCRIPTION OF THE PREFERRED EMBODIMENT

Figure 1:
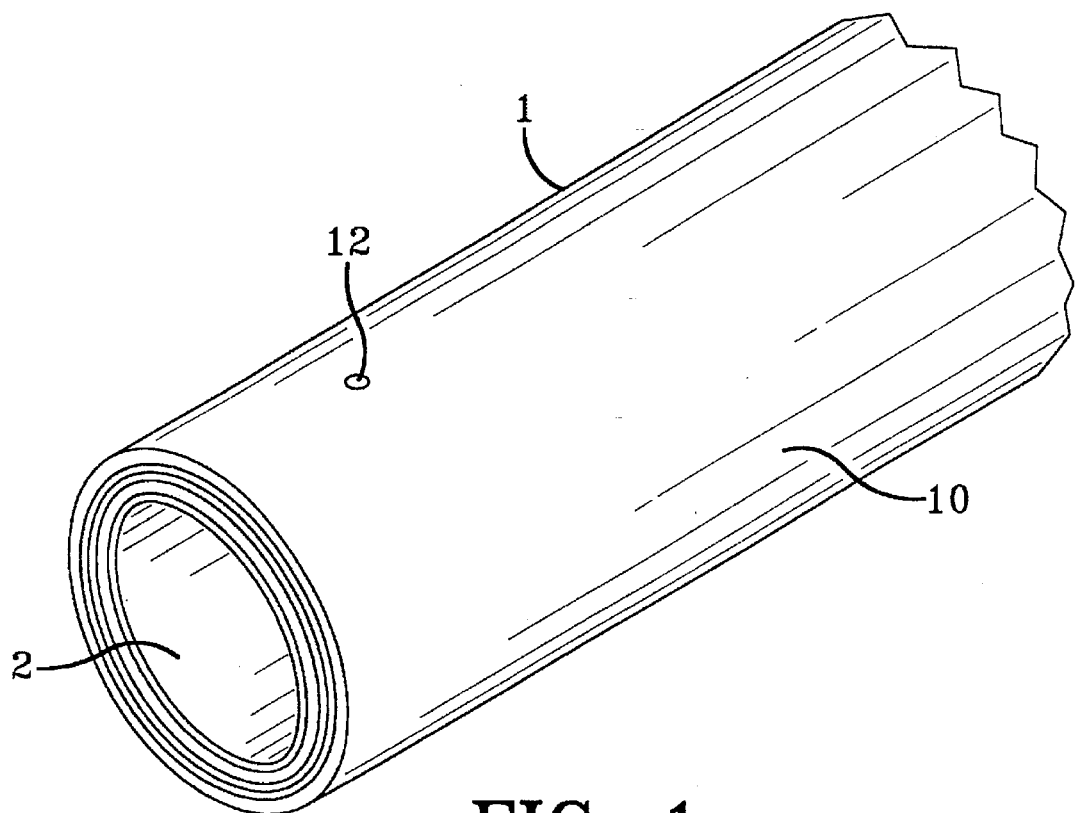
FIG. 1 is a perspective view showing the hose for suction and discharge of ore slurry or any other abrasive material with the wear detector sensor already installed in same.
Figure 2:
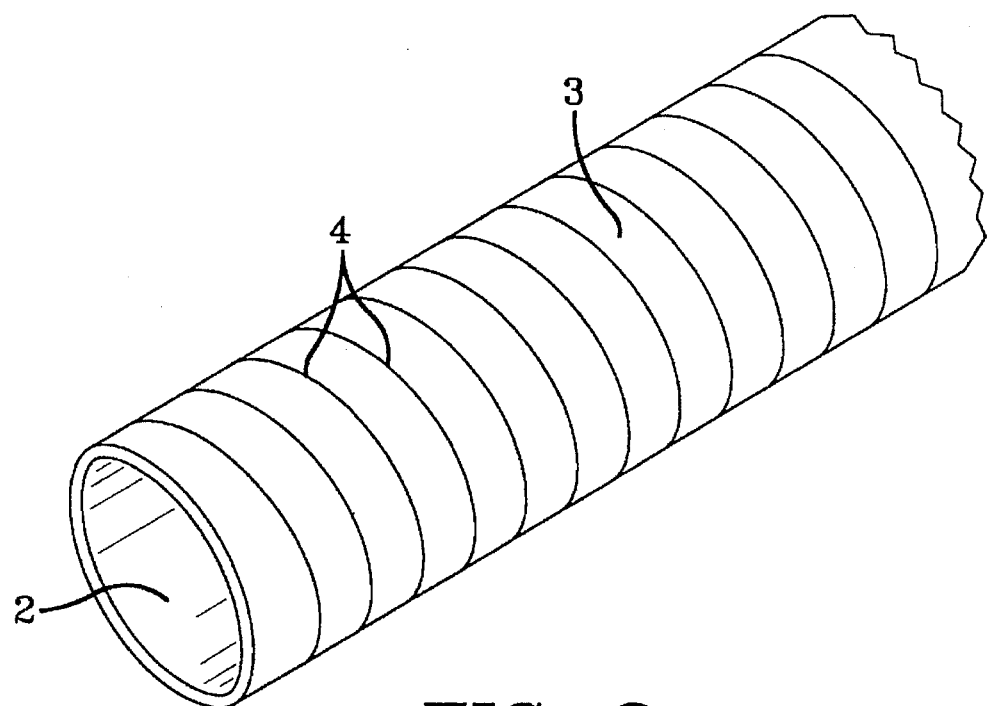
FIG. 2 is a cross-section view showing the first layer of copper wires already applied over the entire extension of the hose of the present invention.
Figure 3:
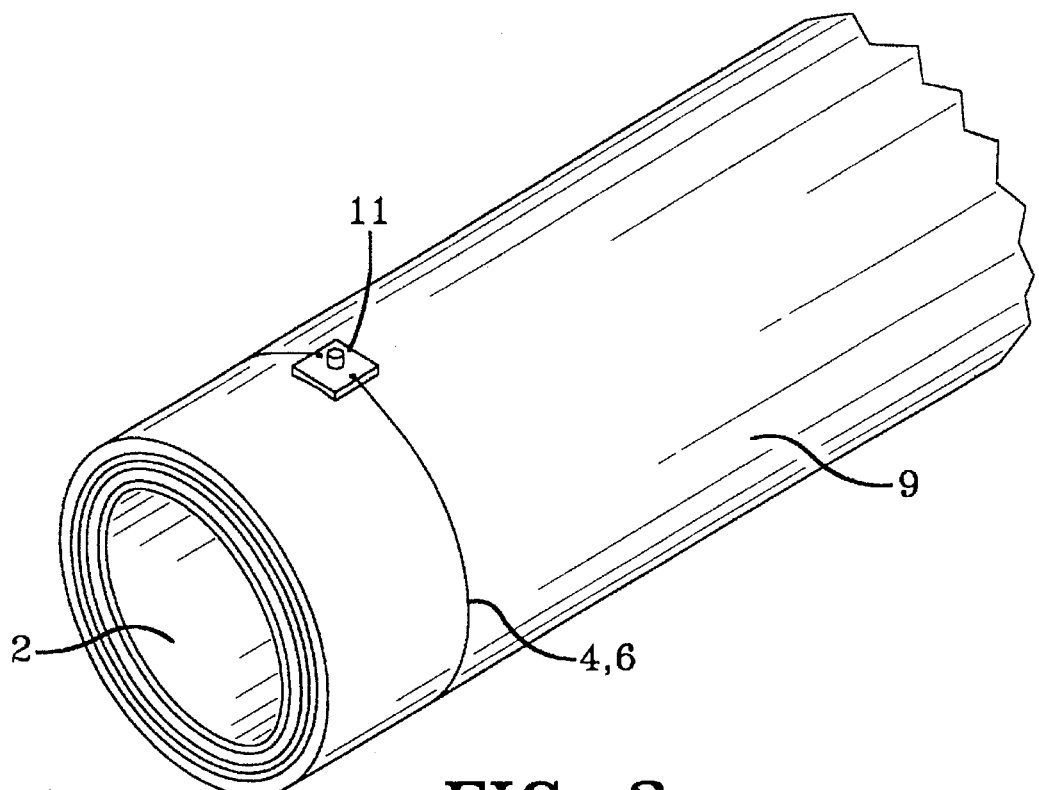
FIG. 3 is a cross-section view showing the bi-polar polar socket of the wear detector sensor already installed in the hose of the present invention.
Figure 4:
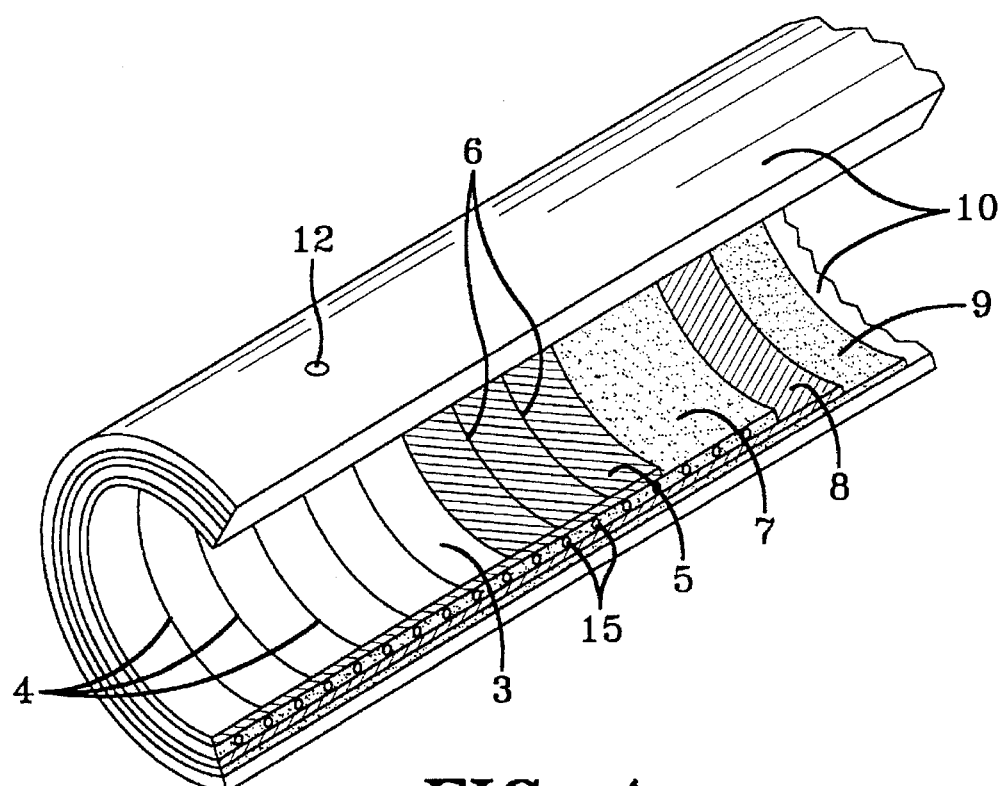
FIG. 4 is a cross-section view showing all the layers which make up the hose for transport of abrasive material of the present invention.

The hose 1 for suction and discharge of ore slurry or any other abrasive material of the present invention may present various different internal diameters as well as different final lengths. However, said hoses 1 usually present internal diameters 2 in the range of from 2 to 40 cm (1 to 16 inches) and final lengths of up to 20 meters.

The referred hose 1 for transport of abrasive material of the present invention is manufactured over a mandrel, which will determine the internal diameter of said hose, variable in accordance with the use of the hose. Over the mandrel an inner lining 3 is applied, made of abrasion resistant rubber, over which in turn a first layer of braided copper wires 4 is placed. Subsequently, the first layer of carcass fabric 5 is applied and over this a second layer of braided copper wires 6 is applied. Further, the referred hose 1 receives a second layer of carcass fabric 7, a steel wire helix 15, third 8 and fourth 9 layers of carcass fabric.

Said layers of carcass fabric or reinforcement 5, 7, 8 and 9 are pressure resistant and specific for the manufacture of hoses designed for the transport of abrasive material, each one being provided with an inner reinforcement consisting of a plurality of sets of at least three braided wire yarns which merge with the rubber after curing, thus forming the carcass fabric layers.

In the last layer of carcass fabric 9 a bi-polar socket 11 is fixed, to which are connected the braided copper wires 4 and 6. Preferably, the terminal ends of the braided copper wires 4 and 6 will be attached to the socket, after having passed through the layers of carcass fabric. Finally, the hose 1 receives a rubber finishing layer 10, thus exposing one end of the connector 12 of the socket 11 to receive the wear detection device.

The inner lining layer 3 is comprised of an abrasion resistant rubber, the carcass fabric layers are reinforced with braided wire yarns as mentioned above, the finishing layer lining 10 being made of strong rubber. After it is assembled, the hose is vulcanized.

The detection of the wear of the hose 1 is carried out in a very simple manner, by means of the simple introduction of the plug of a portable device for checking the continuity of an electrical circuit (not shown in the figures) in terminal end 12, in the bi-polar socket 11 placed on hose 1. In case the electrical circuit is interrupted, this means that one of the braided copper wires of the first or second layers 4, 6 was interrupted due to wear of the internal lining 3 and, consequently, the hose 1 already shows signs of wear, needing therefore to be replaced.

Additionally, the present invention may be shown in another embodiment, wherein the bi-polar socket 11 may be connected to a hearing or visual alarm system, for example, the bi-polar socket 11 being connected to a light bulb or a buzzer, so as to indicate an interruption in the electrical circuit in the hose for transport of abrasive material 1.

Therefore, the sensor for wear detection 11 of the present invention permits safe checking of the wear of the hose for transport of abrasive material, thus avoiding that said hoses present leakages or even blow up when in use and, further, permitting that said checking be carried out without interrupting the work.

Although just one preferred embodiment of the present invention has been described in a detailed manner, for the purpose of comprehension, it must be clear to those skilled in the art that several variations in the details may be effected without detracting from the scope of the invention, as defined in the attached claims.

I claim:

1. A hose (1) for suction and discharge of ore slurry or any other abrasive material, which comprises:

an inner lining (3) consisting of an abrasion resistant rubber;

four carcass fabric layers (5, 7, 8, 9) applied over said inner lining;

a rubber finishing layer (10) applied over the fourth layer of carcass fabric (9); the hose 1 comprising a first and a second layer of braided copper wire (4, 6) which extend spirally over the entire length of the hose 1, the first layer of copper wire (4) being placed between said inner lining (3) and the first carcass fabric layer (5) and the second layer of braided wire (6) being placed between the first layer of carcass fabric (5) and the second layer of carcass fabric (7), wherein said first and second layers of braided copper wires (4, 6) are connected to a bi-polar socket (11) which is fixed to said fourth carcass fabric layer (9).

2. The hose, in accordance with claim 1, wherein the bi-polar socket (11) is placed between the fourth layer of the carcass fabric (9) and the finishing layer (10) so that it has a connecting end (12) which is exposed on the finishing layer (10) to be fitted to a detection device.

3. The hose, according to claim 2 wherein the connecting end (12) of the bi-polar socket (11) is connected to a detection device such as a visual indication system.

4. The hose, according to claim 2 wherein said connecting end (12) of the bi-polar socket (11) is connected to a detection device such as a heating indication system.

* * * * *